United States Patent [19]

Nesteruk

[11] 3,811,925

[45] May 21, 1974

[54] METHOD OF APPLYING A HOT LUSTER COATING TO GLASS BY ELECTROSTATIC MEANS

[76] Inventor: Edward P. Nesteruk, c/o Engelhard Industries, 430 Mountain Ave., Murray Hill, N.J. 07974

[22] Filed: Oct. 28, 1971

[21] Appl. No.: 193,547

[52] U.S. Cl. ............... 117/93.4 R, 65/60, 106/1, 117/93.4 NC, 117/123 A, 117/123 B, 117/124 A, 117/124 C, 117/130 R
[51] Int. Cl. .................... B05b 5/00, C03c 17/20
[58] Field of Search ....... 117/54, 93, 4 NC, 93.4 R, 117/124 A, 124 C, 123 A, 123 B, 130 R; 106/1

[56] References Cited
UNITED STATES PATENTS

| 3,313,632 | 4/1967 | Langley et al. ............ 106/1 |
| 682,310 | 9/1901 | Zsigmondy ................ 117/125 |
| 3,689,304 | 9/1972 | Bamford .................. 117/124 A |
| 3,266,912 | 8/1966 | Murphy ................... 117/124 C |
| 3,660,061 | 5/1972 | Donley et al. ............ 117/124 A |
| 2,994,614 | 8/1961 | Fitch ..................... 106/1 |
| 3,345,199 | 10/1967 | Fitch .................... 117/124 C |
| 3,645,778 | 2/1972 | Nesteruk ................. 117/93.4 |
| 3,391,010 | 7/1968 | Hand ..................... 117/130 R |
| 3,163,665 | 12/1964 | Fitch .................... 117/130 R |

FOREIGN PATENTS OR APPLICATIONS 749,431    10/1970    Belgium

*Primary Examiner*—William D. Martin
*Assistant Examiner*—William H. Schmidt
*Attorney, Agent, or Firm*—Morton, Bernard, Brown, Roberts & Sutherland

[57] ABSTRACT

Hot, stable, solid substrates, e.g. glass, are coated by contact with an electrostatically-charged dispersion of an organic vehicle solution containing thio compounds of gold and silver, and one or more of iron 1,3-beta diketonate, bismuth alcoholate or caroxylate and silicon alcoholate. Preferred ingredients of the solution include gold and silver mercaptides and iron acetylacetonate, and a preferred solvent is methylene chloride.

20 Claims, No Drawings

METHOD OF APPLYING A HOT LUSTER COATING TO GLASS BY ELECTROSTATIC MEANS

This invention relates to the coating of hot, solid substrates with gold-containing compositions to form luster films on the substrates. More particularly, the invention is concerned with coating hot, solid substrates by contact with dispersed, electrostatically-charged particles of an organic solvent solution containing soluble forms of thio compounds of gold and silver, and one or more of iron 1,3-beta diketonate, silicon alcoholate and bismuth alcoholate or carboxylate to impart a colored luster to the substrate, especially to glass. The films have good quality in terms of luster, color, adherence and other physical characteristics. The invention also pertains to solvent solutions as new compositions of matter.

Gold-containing films have been formed on glass and other solid objects for decorative purposes for many years. Quite often, if not always the case, in commercial practice, a coating is placed on the substrate at ambient or other relatively low temperatures which do not cause decomposition or volatilization of any significant amount of the coating composition. Subsequently, the coated substrate is heated or fired to form a gold-containing film, and the film may have various colors depending on the choice of any other metal component present in the film. The films can be described as cold luster films.

Although cold luster films have received wide commercial acceptance, at least on tableware and other decorative objects, the cost of manufacturing the articles is relatively high. In the process the substrate is usually formed at relatively high temperatures, for instance in the case of glass by melting the solids in a furnace, and subsequently forming articles and cooling them to permit their being coated with the gold-containing composition. The articles are usually then reheated or fired to form the film on the substrate. This reheating procedure involves significant labor costs when, as is often the case, the articles are handled and stored between the forming and coating steps. As a result the articles may collect dust or other foreign objects and special precautions must be taken to insure that the articles are clean when the cold luster coating is applied; otherwise, the film may exhibit poor adhesion to the substrate and therefore be easily removed. Also in some instances the cold luster films have had other undesirable properties.

There are a number of proposals in the art for applying metallic films on hot substrates in order that the coating compositions will decompose upon contact with the hot, solid surface to produce the desired film. The advantage of this procedure is that the shaped, solid substrate can be coated while still hot due to its being heated during forming, and often such temperatures are in the range of about 800 to 1,500°F. Thus in the case of glass articles, they can be removed from a mold and coated before being placed in a lehr for annealing. In this manner no significant addition of heat is needed for applying the film, and no further handling than is ordinarily necessary is required. Also, since the articles would be coated more or less immediately after being formed at high temperature and while still hot, the presence of foreign substances, such as dust, on the surfaces of the articles is unlikely.

To the extent that these hot coating procedures have been successful on a commercial scale, they have been employed for the most part, if not entirely, in connection with base metal films. Base metals, however, frequently do not afford wide variations in colors and thus their use leads mostly to films which are amber, brown or gray and do not have the luster appearance that gold-containing compositions could provide. There are indications in the art that hot coating techniques employing gold-containing compositions have been evaluated, for instance, see U.S. Pat. Nos. 3,185,586 and 3,087,831, but I have found that efforts in this regard are generally unsuccessful if one merely applies a solution of a gold compound to the heated surface. Similar results were apparently obtained by the patentee of U.S. Pat. No. 3,087,831, who indicated that films applied to hot glass by using compositions containing gold chloride are powdery. To overcome the problem the patentee covered the gold film with a base metal oxide.

By the present invention I have found that gold-containing luster films of good appearance and physical characteristics can be formed on various hot, solid substrates, especially glass, by contact with an electrostatically-charged dispersion of the gold-containing compositions. These results are obtained when the compositions used are organic solvent solutions containing soluble forms of gold and silver thio compounds and one or more of an iron 1,3-beta diketonate, silicon alcoholate and bismuth alcoholate or carboxylate. In the procedure the heat in the substrate serves to volatize the solvent from the composition and substrate, and decompose the metal and silicon components to a desirable high quality, well-adhering film on the substrate. These films generally have a characteristic luster and reflectance and can be made in a variety of colors, including reds, violets, blues and greens. The coated articles thus exhibit high luster and excellent physical characteristics in a range of desirable colors.

The deposition of gold on hot substrates often leads to films which poorly adhere to the substrate. In many instances the films can be readily removed by rubbing and they may also provide undesirable color effects. I have found that these difficulties are avoided in the method of the present invention when the solutions contain soluble forms of gold and silver thio compounds and one or more of iron 1,3-beta diketonate, silicon alcoholate, and bismuth alcoholate or carboxylate. The silver may contribute little to the color of the films although this component apparently makes the gold films more adherent to the substrate. The base metal and silicon components of the coating solutions serve as a binder for the gold-containing film and can make a contribution to its color. The resulting films are adherent to the substrate and usually exhibit good coating or application efficiency.

Coating efficiency is an important consideration in view of the relatively high cost of the precious metals in the compositions, and the short time that the substrate may be subjected to the electrostatic-charged dispersion during coating. In many article or substrate-forming techniques the production rate is very fast and only a few seconds or less may be available for application of any film if the article is to remain hot without providing for further heating. Additionally, if the coating time becomes extended and relatively large quantities of coating composition are applied to the substrate, the cooling effect on the article may be so great that well-adhering, high quality films may not be obtained. The gold-containing coating compositions of the present invention exhibit good coating efficiency at coating times of the order of about 0.5 to 5 seconds. Although the use of electrostatic-charged particles contributes to this result, I have found that many gold-containing coating formulations not having the composition of the solutions of the present invention do not have good coating efficiency even when applied as an electrostatically-charged spray.

The gold and silver components in the coating solutions of this invention are organic thio or sulfur-containing compounds which are soluble in the solvent vehicle of the compositions, at least to an extent sufficient to provide the desired amount of these precious metals in solution. The gold and silver components are generally present in minor amounts in the solution, and the solvent solutions may often contain in solution about 0.2 to 4.5 weight percent gold, preferably about 0.5 to 2.5 weight percent, and about 0.05 to 4.5 weight percent silver, preferably about 0.1 to 2 weight percent. The gold is a primary colorant and is generally used in an amount sufficient to provide a film of the desired luster and color; however, this amount should not be so great that the film does not adhere well to the substrate. The silver is employed in an amount sufficient to improve the adhesion of the gold-containing film to the substrate, and the silver apparently serves to bring the gold into the film so that the latter becomes an intimate part of the film and cannot readily be removed from the substrate by rubbing or other contact which a given article would experience during normal use. The ratio of silver to gold in the coating solution should not be so great as to make the film have poor adherence properties taking into account the type of use that will be made of the coated articles. The weight ratio of silver to gold is often about 0.15 to 1.2:1, preferably about 0.5 to 1:1. The total amount of gold and silver in the solutions should also not be so great as to produce poorly adhering films. For instance, this total amount is often about 0.5 to 5 weight percent of the compositions, preferably about 1 to 3 weight percent. These precious metals are apparently reduced or decomposed upon contact with the heated substrate and any subsequent heating, and it is believed that these metals are for the most part present as the elemental metals, especially in the case of gold.

The gold and silver components of the compositions of this invention are soluble in the organic solvent-containing vehicle employed, and various forms of suitable thio organic compounds of these metals can be used. For example, compounds having about 6 to 40 or more carbon atoms can be employed, for instance, the gold and silver mercaptides, especially the alkyl mercaptides, preferably having about 9 or 12 to 24 carbon atoms. These alkyl groups are preferably tertiary in structure. The choice of metal compounds may depend on the solvent, or vice versa, in order to form the desired solution, and combinations of compounds which react to take one or more of the metals out of solution should be avoided. The compounds should not be unduly deleterious to the film desired, and preferably the compounds consist essentially of the metal, carbon, hydrogen, and sulfur, with or without oxygen. Components having a gold or silver bond to sulfur are employed with advantage. Among the useful forms of these metals are the metal mercaptides, sulfurated carboxylates, sulfur-containing resinates and the like. The useful compounds of these metals thus include, for example, the tertiary alkyl mercaptides disclosed in U.S. Pat. No. 2,984,575; gold salts of sulfurized terpenes; gold cyclic terpene mercaptides, see U.S. Pat. No. 2,490,399; the gold mercaptide of thioborneol; the separate gold and silver thio compounds and their coordination compounds disclosed in British Pat. No. 1,009,539 which may provide both the gold and silver components of the solution; and the like. The compounds may be aliphatic, aromatic, cycloaliphatic, or mixed compounds of such character. The gold and silver compounds employed have sufficiently low vapor pressures that they remain in the solvent solution under handling conditions, and yet, they must decompose or be reduced at the temperature encountered on the hot substrate.

Satisfactory films are not generally obtained in accordance with this invention unless the gold and silver-containing compositions further include a solvent-soluble form of an iron 1,3-beta diketonate, silicon alcoholate or bismuth alcoholate or carboxylate, or various combinations of two or all of these base metals and silicon components. The presence of both the iron and silicon components is highly desirable in the solutions of this invention, with or without the bismuth component. The organic base metal or silicon components are also a minor amount of the metal-containing solution applied by the method of this invention, and a sufficient amount of the total of these base metals and silicon is used to obtain a film of desired color that adheres well to the substrate and has good coating efficiency. Typically, the total amount of iron, bismuth and silicon present in the solvent solution is an amount of about 0.5 to 8 weight percent, preferably about 1 to 4 weight percent, based on the total solution. I have obtained the best results when using solutions containing a weight ratio of total silver and gold to total iron, bismuth and silicon of about 0.2 to 3:1, preferably about 0.5 to 2:1.

The forms of the base metals and silicon that can be used are the solvent or vehicle-soluble forms of the iron 1,3-beta diketonates, the bismuth and silicon alcoholates and the bismuth carboxylates. The alcoholates are considered as having characteristic bismuth or silicon to oxygen to carbon bonds, and often most to essentially all of the bismuth and silicon in the alcoholates is believed to have this type of bonding. Such structures generally result from the reaction of alcohols or hydroxy-bearing materials with a bismuth or silicon component such as their chlorides or other salts. Some of these reaction products may have fairly high molecular weights and thus they have been referred to as resinates. The alcoholates can also be designated as organo oxysilanes. The iron 1,3-beta diketonates are the iron salts or complexes of diketones having the characteristic structure

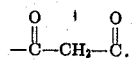

These diketones have carbon atoms of aliphatic or cycloaliphatic configuration with respect to each other, and are usually saturated, i.e. the carbon atoms are linked together by only single bonds. The use of iron acetylacetonate is particularly desirable in this invention. The base metal and silicon compounds should not serve to precipitate any other essential component from the solution or be unduly deleterious to the film desired.

Generally the useful organic compounds of iron, silicon and bismuth contain up to about 20 or 24 carbon atoms per valence of these base metals or silicon present, and often at least about 4 carbon atoms per valence. The silicon has been especially employed in the form of alcoholate reaction products of silicon tetrachloride and alcohols, while the bismuth compounds used with advantage include the bismuth fatty acid salts. The silicon and bismuth compounds may be aliphatic, aromatic, cycloaliphatic or mixed compounds of such character. Examples of suitable base metal and silicon components which can be employed in this invention include the bismuth naphthenates, oleates, benzoates, resinates, alcoholates of 2-ethylhexanol, lauryl alcohol, stearyl alcohol, and the like. Similar alcoholates of silicon are among those that can be employed. The iron, bismuth and silicon compounds used in the solution of this invention are not so volatile that they will not remain in the solvent solution under handling conditions, and yet, they must decompose or be reduced at the temperatures encountered on the hot substrate. These metals and silicon seem to decompose to their oxides when applied to the hot substrate in accordance with this invention.

The coating compositions of this invention may contain other ingredients which are sufficiently soluble in the solvent used to provide a desirable effect. These materials, when employed, are usually in the solution in minor amounts and may be compounds of non-metals, base metals or precious metals, for instance, of the types mentioned above with respect to the other metal components of the compositions, especially the oxygen-containing compounds. Suitable amounts of these additional materials include the same ranges given above with respect to the base metal and silicon. Lesser amounts of these additional materials may be present, and especially the precious metals of the platinum group may be used with advantage in lesser amounts, e.g. down to about 0.005 weight percent. Thus the presence of very small amounts of rhodium in the coating compositions has led to films having electrical conductivity. These additional components, similar to the other materials in the solvent, are not employed in amounts or forms which produce undesirable amounts of solid materials in the solvent solution, nor in amounts so great that the film formed on the substrate is so undesirable either in color or other chemical or physical characteristic, such as adhesion, that the coated article is of unacceptable quality. The amounts of the several components employed in the compositions, as well as their chemical nature, may be altered for best results. For instance, the presence of titanium in the solution may detract from the performance of bismuth, especially if iron or silicon is not in the composition. Also nickel may detract from the performance of iron when the latter is employed in only a small amount in the coating composition and silicon is absent.

The major component of the solutions of this invention is the organic solvent or vehicle. The solvent and the various metal and silicon components that are used are chosen so that adequate solution of the metals and silicon is obtained, and a variety of normally liquid, polar or non-polar organic solvents can serve in the compositions. Generally the solvents have sufficient volatility so that they are removed from the film as it is formed on the hot substrate. These solvents often boil below about 100°C., preferably below about 75°C., and have flash points sufficiently high to avoid fires and explosions during application of the films to the heated substrates. It is also preferred when employing a spray gun that has its charging electrode flush with the tip of the gun, that the solvent exhibit electro-conductivity. Such conductivity is not a significant factor when the spray gun has a corona discharge member spaced slightly away from the spray tip of the gun in the path of the spray. In this regard the manufacturers of electrostatic spraying equipment often recommend solvents which perform best in their equipment and such directions may be a consideration in selecting the solvent. There is evidence that the more volatile the solvent the greater the coating efficiency.

The chlorinated hydrocarbon solvents have been found to be especially useful in the compositions of this invention and a particularly preferred solvent is methane dichloride or methylene chloride, which exhibits good solubility for metal compounds such as iron acetylacetonate. Other solvents which are useful include oxygen-containing solvents such as alcohols, ketones, esters; hydrocarbons; and the halogenated hydrocarbons such as trichloroethylene, perchloroethylene, chloroform, carbon tetrachloride and other chlorinated hydrocarbons and chlorinated ketones. Frequently the solvent vehicle forms about 75 to 98 weight percent, preferably about 80 to 95 weight percent, of the coating solutions of this invention. These solutions can be formed by simple mixing of the several components in any desirable fashion.

The solid substrates which can be coated in accordance with the present invention are stable in air at temperatures up to those employed during the coating procedure. Such temperatures are often in the range of about 700 to 1,500°F. These substrates thus include ceramics, glasses, glass-ceramics, porcelains and metals that do not form loose oxide films in air at the indicated temperatures, for instance aluminum, nickel, iron alloys such as stainless steel, and titanium. The substrates may be glazed or unglazed and transparent, translucent or opaque. Transparent glasses, for instance soda-lime and opal borosilicate glasses, are especially preferred substrates for use in this invention.

The temperature of the substrate when it is coated in accordance with the process of this invention is generally not so great as to cause deformation of the substrate, but is sufficient to reduce the coating composition to the metal or metal oxide-containing film and remove the bulk or essentially all of the solvent before or more or less immediately upon contact of the dispersion with the substrate. Typically, these temperatures are in the range of about 700 or 800 to 1,500°F., preferably about 900 to 1,200°F. Although a convenient time of exposing the surfaces of the substrate to the coating compositions is while the substrate is still at a temperature in the desired range due to heating of the material of the substrate as it is formed into an article of particular design, cooled articles or substrates can be reheated to the desired temperature range for coating. In some instances it may be desirable to heat or fire the coated article to alter the characteristics of the film or the substrate, and such heating may be in the temperature ranges indicated above for coating. In the case of glass the heating can be accomplished during the usual lehr or annealing treatment employed in glass manufacture procedures.

The coating compositions of the present invention are applied to the hot substrate under the influence of an electrostatic charge. The compositions are finely distributed in a gas as a dispersing medium, for instance, as a spray into air or other gaseous atmosphere. The dispersion can be formed by discharge from an electrostatic-charging device towards the substrate, and the resulting particles of solution are attracted to the hot substrate to be coated. This attraction is apparent whether or not the substrate is electrically grounded, although grounding may increase the speed of the coating to some extent. The electrostatically-charged particles may either be positive or negative, although the latter is preferred, and it is highly desirable that the coating process be completed in not more than about 5 seconds, especially in up to about 2 seconds, residence time in the coating atmosphere. These short coating times enable efficient use of the coating compositions and avoid overcooling of the hot articles which are being coated. Conventional electrostatic spray equipment can be employed in this invention and typically these devices have discharge voltages exceeding about 50,000 volts, and often up to about 200,000 volts or more.

The following examples illustrate certain processes and compositions of the present invention.

The compositions were prepared by simple mixing of the several named ingredients while stirring at room temperature. During the coating operation, the composition at ambient temperature was pressure fed to a commercially available electrostatic spray gun having a voltage in the range of about 60,000 to about 100,000 volts. Air was fed to the spray gun as the dispersing medium. The spraying rate was about 1 cc./second and the spraying time was about 1 to 2 seconds. The article or substrate to be coated was heated from ambient temperature to about 1,000 to 1,100°F. in an oven and placed, while at this elevated temperature, on a rotatable plate which was not electrically grounded with respect to the hot article. The rotatable plate was positioned in a vented hood exposed to room temperature and atmosphere. The hot article was rotated on the plate while being exposed to an electrostatically-charged spray of the coating solution to form a thin luster film on the article. The article was annealed in a conventional manner starting at a temperature of about 1,000 to 1,200°F. The annealed article was observed as to the color and appearance of its luster film. The substrates were soda-lime glass tumblers, 8-ounce size.

Descriptions of the compositions employed and the observations made regarding the films formed are reported in the following table. The metal, silicon and boron components were placed in solution in methylene chloride as the principal organic solvent. Each of these components, except ferric acetylacetonate, was employed as a solution in an organic solvent and the amounts of a given metal, boron or silicon in these solutions are reported on the basis of weight percent in its solution before mixing with methylene chloride to form the compositions of this invention.

TABLE

Parts By Weight

| No. | Au t-do-decyl-mer captide, 28% Au[9] | Ag t-do-decyl-mer captide, 30% Ag[10] | Silicon[2] component, 20% SiO$_2$ | Ferric acetyl-acetonate, 15.3% Fe | Bismuth octoate, 30% Bi$_2$O$_3$[10] | Other component | Solvent | Film Color | Remarks |
|---|---|---|---|---|---|---|---|---|---|
| 36 | 6.2 | 1.5 | — | — | 18 | — | 75 | Amethyst | Attractive luster film of high clarity, good adherence after removal of surface dust |
| 64 | 6 | 2 | — | 6 | — | — | 86 | Blue-Green | Attractive film of high luster, marginal adherence[8] |
| 67 | 6 | 6 | 2 | 5 | — | — | 81 | Blue-Green | Nice color marginal adherence |
| 76 | 6 | 4 | 15 | 0.5 | — | — | 75 | Red | Excellent film |
| 80 | 4.3 | 2.5 | 7 | 1 | 3 | 1[3] | 82 | Violet | Nice film |
| 84 | 4 | 2.5 | 2 | 6 | — | — | 86 | Blue-Green | Nice film |
| 85 | 4.5 | 2.5 | 7 | 4 | 2 | 1[3] | 80 | Blue | Nice film |
| 95 | 4.5 | 1.2 | 7 | 2 | 2 | 3[4] | 80 | Blue | Nice film |
| 97 | 4 | 1 | 5 | 5 | — | — | 85 | Blue | Nice film color not as clear as in run No. 85 |
| 98 | 4 | 2 | 10 | 0.3 | — | 2[5] | 82 | Red | Excellent film |
| 115 | 4 | 4 | 10 | 0.3 | — | — | 82 | Red | Good film |
| 119 | 6 | 3 | 10 | 0.5 | — | 1[6] | 80 | Violet | Nice film |
| 122 | 5.1 | 1.5 | 9 | — | 1.5 | 1[7] | 83 | Purple | Nice film |
| 135 | 6 | 4 | 10 | 0.3 | — | 2[6] | 78 | Violet-Gold | Good film, electrically-conductive film |

TABLE — Continued

| No. | Au t-do-decyl-mer captide, 28% Au[9] | Ag t-do-decyl-mer captide, 30% Ag[10] | Silicon[2] component, 20% SiO$_2$ | Ferric acetyl-acetonate, 15.3% Fe | Bismuth octoate, 30% Bi$_2$O$_3$[10] | Other component | Solvent | Film Color | Remarks |
|---|---|---|---|---|---|---|---|---|---|
| 203 | 4 | 3 | 7 | — | — | — | 86 | Ruby | Nice film |
| 207 | 7[1] | 4 | 15 | 0.5 | — | — | 75 | Ruby | Good film, slightly dull |

[1] In run No. 207 the Au component was a sulfurated gold resinate solution, 24% Au.
[2] Si component was a commercially-available solution in oil turpentine of a reaction product of SiCl$_4$, benzyl alcohol and trimethylcyclohexanol.
[3] Ti resinate in oil turpentine, 5% TiO$_2$.
[4] Cu neodecanoate solution, 6% Cu.
[5] Boron 2-ethylhexanoate in 2-ethylhexanol, 5% B$_2$O$_3$.
[6] Rhodium octoate in oil rosemary and benzyl acetate, 1% Rh.
[7] Vanadium naphthenate in cyclohexanone, 3.92% V.
[8] Marginal adherence means not as good as on the articles of the other runs, but satisfactory for articles not subject to frequent handling.
[9] Solvent was mainly chloroform and heptane.
[10] Solvent was toluene.

It is claimed:

1. A method of coating a stable, solid substrate to impart color thereto which comprises contacting said substrate while hot with an electrostatically-charged dispersion of an organic solvent solution having in solution minor amounts of gold and silver alkyl mercaptides, and one or more members selected from the group consisting of iron 1,3-beta diketonate, bismuth alcoholate or carboxylate and silicon alcoholate, the temperature of said hot substrate being sufficient to volatize solvent from said solution and decompose said gold and silver compounds and said selected member to provide a colored film on said substrate, said organic solvent boiling below about 100°C., said solution having in solution about 0.2 to 4.5 weight percent gold, and about 0.05 to 4.5 weight percent silver, and the total amount of iron, bismuth and silicon supplied by said members in the solvent solution is about 0.5 to 8 weight percent based on the total solution.

2. The method of claim 1 wherein the substrate is glass.

3. The method of claim 1 wherein the selected member includes iron acetylacetonate.

4. The method of claim 3 wherein the substrate is glass.

5. The method of claim 4 wherein the glass substrate is annealed after contact with the dispersion of said solution.

6. The method of claim 5 wherein the solution contains methylene chloride as a solvent.

7. The method of claim 4 wherein the solution also contains silicon alcoholate.

8. The method of claim 7 wherein the solution also contains bismuth carboxylate.

9. The method of claim 7 wherein the glass substrate is annealed after contact with the dispersion of said solution.

10. The method of claim 9 wherein the solution contains methylene chloride as a solvent.

11. A method of coating a stable, solid substrate to impart color thereto which comprises contacting said substrate while hot with an electrostatically-charged, dispersion of a halogenated hydrocarbon solvent solution having in solution minor amounts of gold tertiary alkyl mercaptide, silver tertiary alkyl mercaptide, and one or more members selected from the group consisting of bismuth carboxylate or alcoholate, silicon alcoholate, and iron acetylacetonate, the temperature of said hot substrate being sufficient to volatize solvent from said solution and decompose said gold and silver mercaptides and said selected member to provide a colored film on said substrate, said solvent boiling below about 100°C., said solution having in solution about 0.2 to 4.5 weight percent gold, and about 0.05 to 4.5 weight percent silver, and the total amount of iron, bismuth and silicon supplied by said members in the solvent solution is about 0.5 to 8 weight percent based on the total solution.

12. The method of claim 11 wherein the weight ratio of silver to gold in solution is about 0.15 to 1.2:1.

13. The method of claim 12 wherein the total amount of gold and silver in solution is about 0.5 to 5 weight percent.

14. The method of claim 13 wherein the solution contains iron acetylacetonate which supplies about 0.5 to 8 weight percent iron.

15. The method of claim 13 wherein the solution contains iron acetylacetonate and silicon alcoholate.

16. The method of claim 15 wherein the substrate is glass.

17. The method of claim 16 wherein the temperature of the substrate when coated is about 900 to 1,200°F.

18. The method of claim 17 wherein the glass is annealed after being coated by contact with said dispersion.

19. The method of claim 18 wherein the gold and silver mercaptides are tertiary dodecyl mercaptides.

20. The method of claim 19 wherein the solution contains methylene chloride as a solvent.

* * * * *